June 23, 1964  R. F. COOPER  3,137,976
TIRE SIDEWALL GRINDER AND CLEANER MACHINE
Filed Dec. 21, 1962  5 Sheets-Sheet 1

INVENTOR.
RALPH F. COOPER
BY
William L. Reeve
ATTY.

June 23, 1964  R. F. COOPER  3,137,976
TIRE SIDEWALL GRINDER AND CLEANER MACHINE
Filed Dec. 21, 1962  5 Sheets-Sheet 2
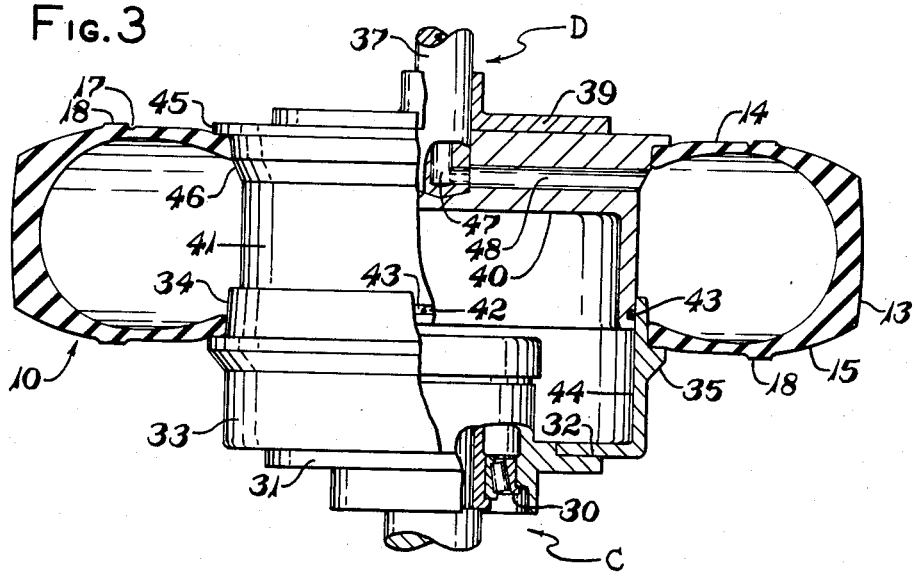
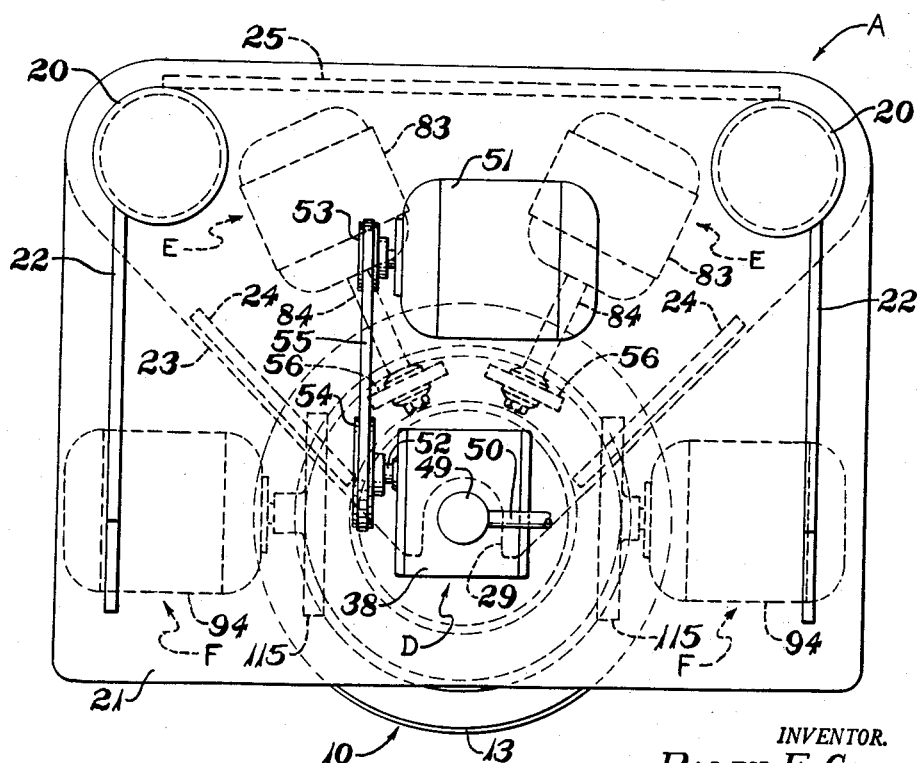
INVENTOR.
RALPH F. COOPER
BY
ATTY.

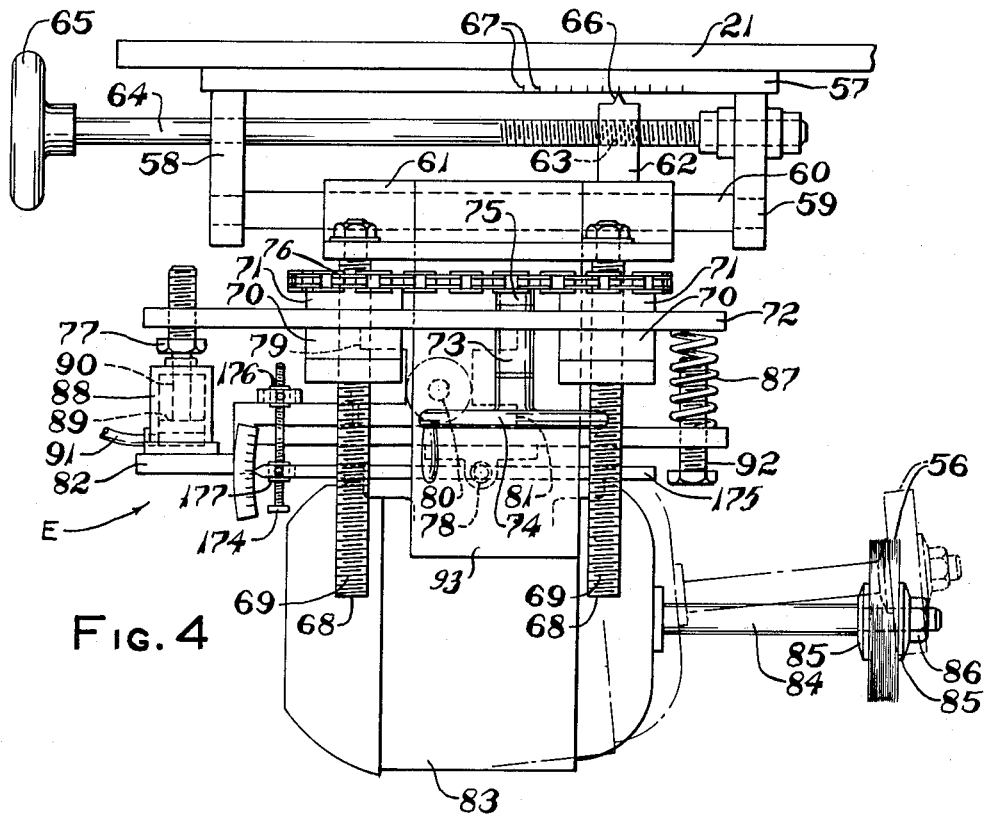
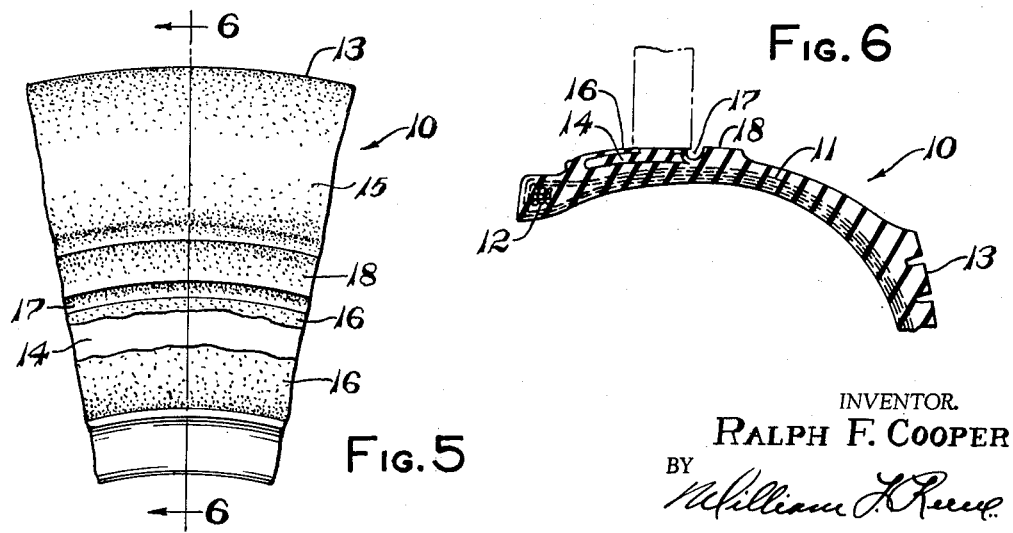

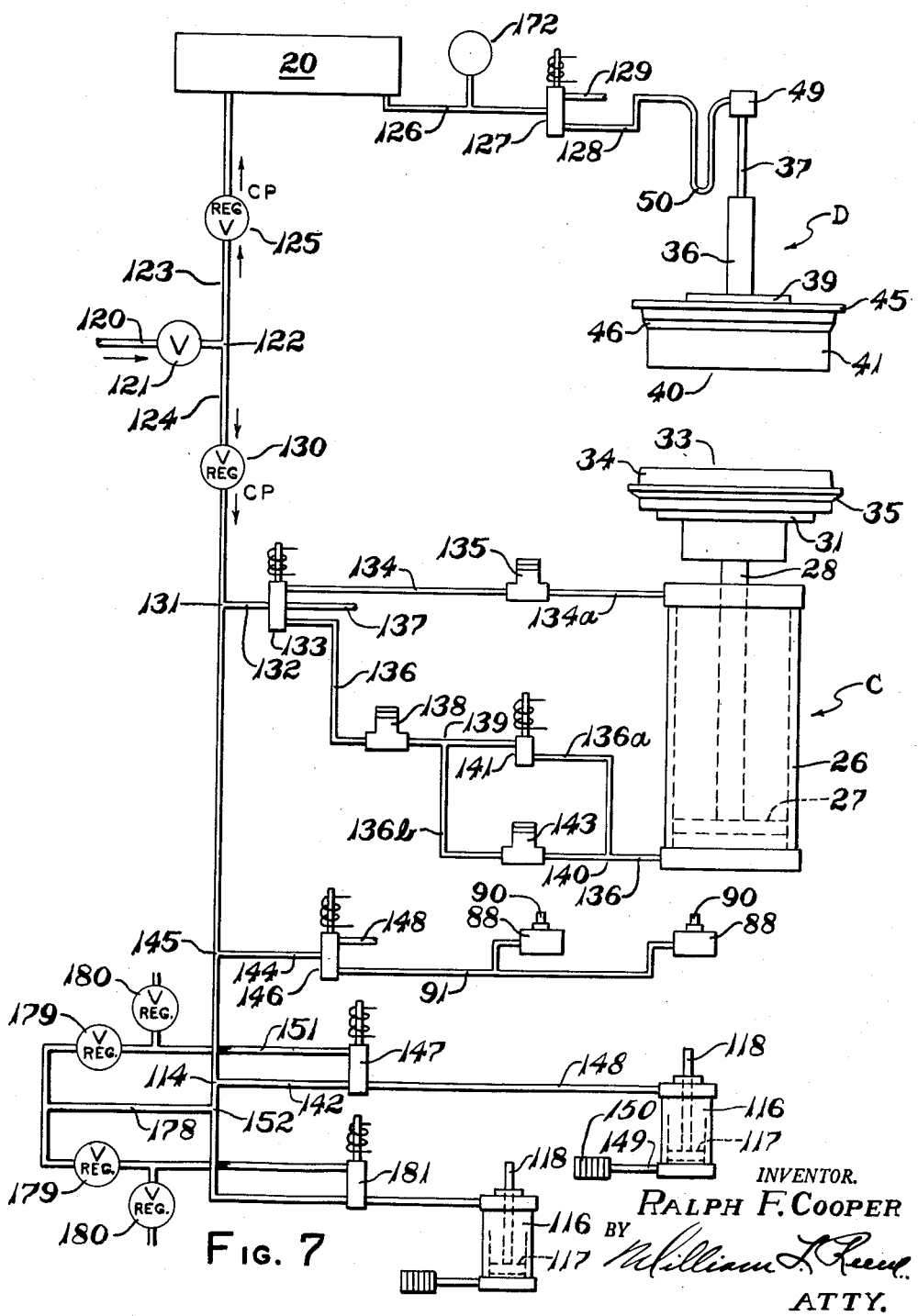

June 23, 1964 R. F. COOPER 3,137,976
TIRE SIDEWALL GRINDER AND CLEANER MACHINE
Filed Dec. 21, 1962 5 Sheets-Sheet 5

INVENTOR.
RALPH F. COOPER
BY William L. Reeve
ATTY.

United States Patent Office 3,137,976
Patented June 23, 1964

3,137,976
TIRE SIDEWALL GRINDER AND CLEANER MACHINE
Ralph F. Cooper, Akron, Ohio, assignor to The B. F. Goodrich Company, New York, N.Y., a corporation of New York
Filed Dec. 21, 1962, Ser. No. 246,562
7 Claims. (Cl. 51—106)

This invention relates to an apparatus for finishing tires, and, more particularly, to a semi-automatic apparatus for the precision grinding and cleaning of a white sidewall tire, and is a continuation in part of my copending patent application for Tire Sidewall Grinder and Cleaner Machine, Serial No. 59,930, filed October 3, 1960 now Patent No. 3,077,060, dated February 12, 1963.

The conventional method of building a white sidewall passenger car tire includes the application of a strip of white sidewall rubber to the uncured tire carcass with the radial inner and outer peripheries of the white rubber overlapping, or overlapped by a thin portion of black rubber. In order for the tire to have visual appeal clean, sharp lines of demarcation between the portions of black and white sidewall material must be produced. Hence, during curing of the tire the sidewall is molded to a configuration including buffing or scuff ribs adjacent the radial inner and outer edges of the white rubber and, preferably, a narrow groove is also formed in the white sidewall side of the tire adjacent the scuff ribs between the black and white areas of the finished tire.

In the past, following vulcanization, the tire was placed on a rim, generally similar to a conventional vehicle rim, inflated, and the overlapping veneer of rubber was ground in the region of the line of demarcation between the white and black areas by means of a continuous belt grinder or rotating grinding wheel. Due to the fact that the sidewall was curved when the tire was so inflated, the grinding surface presented by the belts or wheel left a visual line of demarcation near the center of the white area at the edge of the surface which had been ground, and hence was now somewhat planar, and the underground surface which remained curved. Attempts were made to overcome this deficiency by grinding the entire white sidewall surface with overlapping grinding wheels or by using specially shaped single wheels of sufficient width to embrace the entire radial width of the sidewall. This was not a satisfactory solution to the problem because of the large amount of high cost white sidewall rubber lost in grinding. This problem was further accentuated when it became necessary to produce tires having "ribbon," or narrow band, white sidewalls. Due to the small radial dimension of the white sidewall, the positioning of the sidedwall abrading and cleaning members became critical.

It is an object of this invention, therefore, to provide an improved apparatus for the semi-automatic precision grinding and cleaning of the sidewall of a rubber tire, wherein the sidewalls of said tire are so spread as to present a relatively flat surface for engagement with the grinders and cleaners so that a sharp line of demarcation between the white and black portions of the sidewall, as well as a smooth, clean surface in the white portion is produced.

It is a further object of this invention to provide an improved apparatus for the precision grinding and cleaning of the sidewall of a rubber tire wherein the apparatus has a pair of telescoping split rim tire receiving members that allow the tire mounted thereon to expand, under internal pressure, such that its sidewalls are in a relatively flat posiiton for grinding and cleaning thereof, the said tire receiving members being rotatable to move the tire thereon past rotating grinding and cleaning wheels which selectively engage the sidewall of a tire in timed response to the expansion of said tire.

It is a still further object of this invention to provide an improved apparatus for the precision grinding of the narrow band white sidewalls of a rubber tire in which the grinding and cleaning members may be accurately initially positioned for precise predetermined engagement with the white sidewall in their operative positions.

The manner in which these and other objects and advantages of the invention are obtained will be apparent from the following detailed description of a presently preferred embodiment, illustrated in the accompanying drawings, forming a part of this application, in which:

FIG. 2 is a plan view of the apparatus showing the radial positions of the grinding and cleaning wheels relative to the axis of the tire;

FIG. 3 is a detached view, to an enlarged scale, of the telescoping split rim tire receiving members with a tire mounted thereon, the view being partly in transverse section and partly in front elevation;

FIG. 4 is a side elevational view to an enlarged scale of one of the tire buffing assemblies showing its carriage mounting;

FIG. 5 is a fragmentary side view of a white sidewall tire prior to being ground and cleaned on the apparatus;

FIG. 6 is a fragmentary cross-sectional view taken along line 6—6 of FIG. 5 with the grinding position of one of the grinding wheels shown in phantom;

FIG. 7 is a schematic representation of the pneumatic control lines and devices used on the apparatus.

Figure 1:
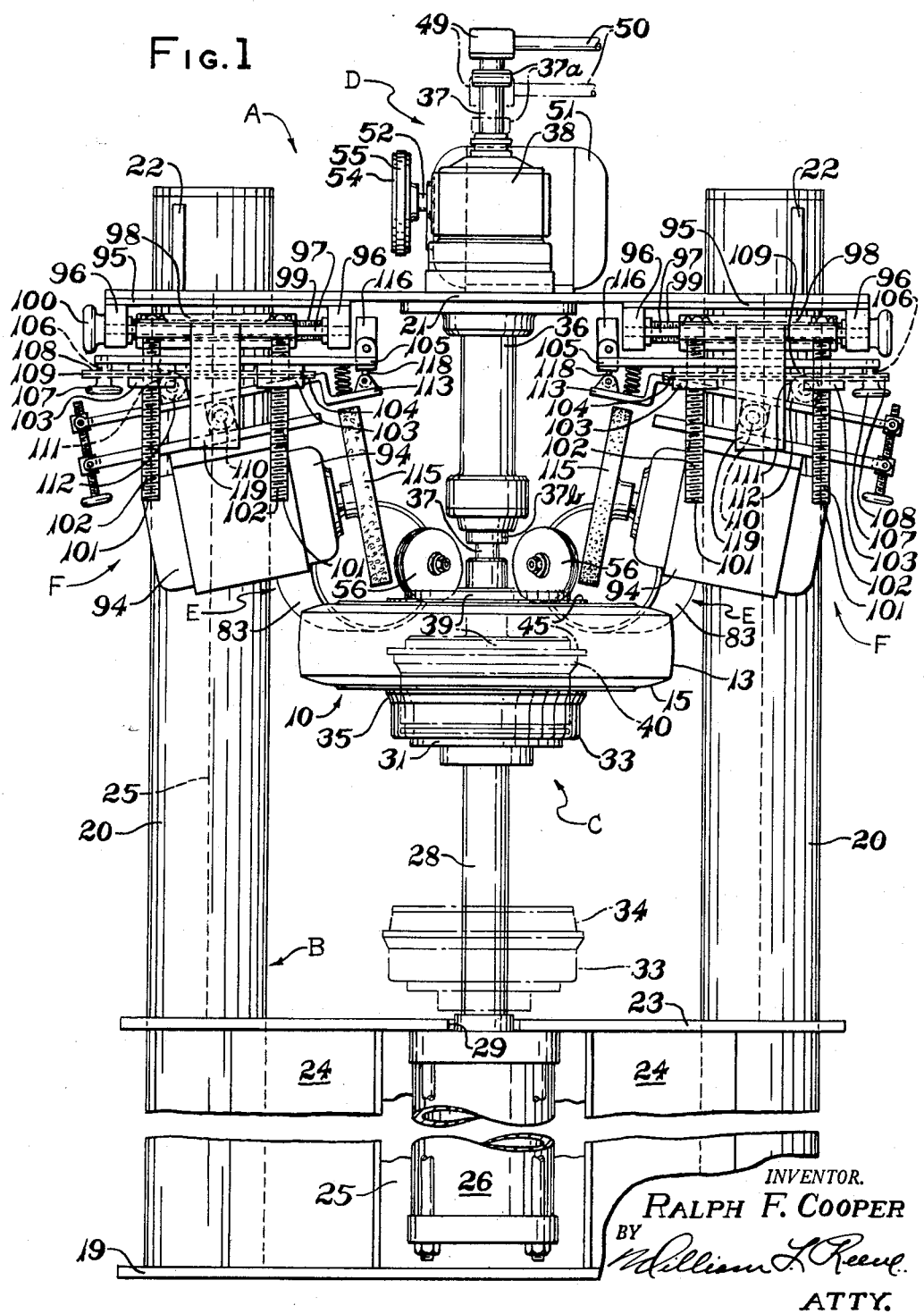
FIG. 1 is a front elevational view of the apparatus with parts omitted and with the telescoping split rim tire receiving members shown in full line in their closed position supporting a tire in engagement with the grinding wheels, the open position of the tire supporting members being indicated in phantom.

The vulcanized tire 10, as shown in FIG. 6, has the usual carcass plies 11 wrapped about inextensible bead cores 12, a tread 13 molded of carbon black reinforced rubber, and a white sidewall portion formed by a band of white sidewall rubber 14. The black sidewall portion 15 may be of the same material as the tread 13, and, a thin skin 16 of black rubber, which may be of the non-staining type, overlies the edges of white rubber 14. Molded into the sidewall 15, adjacent to the white sidewall rubber 14, is a groove 17 next to which is molded a curb scuff rib 18. In order to provide the desired sharp demarcation between the white sidewall 14 and the black sidewall portion 15, the portions of the skin 16 overlying the white sidewall 14 must be ground away and the resultant abraded surface must be cleaned and buffed smooth.

General Arrangement

In the presently preferred form, the apparatus A for effecting the required grinding and buffing of the tire 10 has operative portions mounted on a frame B. Frame B comprises a base 19 and two vertical side supports 20 of cylindrical construction, the ends of which are sealed so that the supports may be used as a reservoir for the air used in the pneumatic control system. A cantilever support member 21 is mounted on the upper portions of the vertical side supports 20 and is braced thereto by means of triangular braces 22. A horizontal work platform 23 is mounted between the vertical supports 20 and projects forward therefrom. The platform 23 is spaced vertically from the base 19 by means of a pair of vertical support plates 24 and a vertical back support 25 mounted between the vertical supports 20 and also between the base 19 and the rear edge of the work platform 23. Vertically mounted on the work platform 23 is the lower tire supporting assembly C. The upper tire mounting, rotating and inflation assembly D is mounted on the upper cantilever support 21.

Suspended beneath the cantilever support 21 are a pair of tire sidewall buffing assemblies E and a pair of tire sidewall abrading assemblies F. These are each disposed radially of the axis of the tire mounting assembly D so that the axes of the assemblies E and F intersect the axis of the tire mounting assembly D.

*Tire Mounting, Inflation and Rotating Assemblies*

The lower tire support assembly C comprises a large, double-acting air cylinder 26 mounted on the underside of the work platform 23. This cylinder has a piston 27 from which piston rod 28 extends vertically through a slotted opening 29 in the work platform 23. Rotatably mounted by means of a bearing 30 on the upper end of piston rod 28, see FIG. 3, is a rim hub 31 having an annular rim receiving surface 32 formed on the outer top surface thereof. Removably seated on the surface 32, and mounted thereto by means not shown, is the lower, split rim, tire receiving member 33. The member 33 is so constructed as to have a tire bead base receiving tapered portion 34 and a tire bead seating flange 35 circumferentially formed thereon to hold a tire 10. Thus, a tire 10 may be held thereon and raised for engagement with the assembly D as air is introduced to the lower side of the piston 27.

The upper tire mounting, rotating and inflation assembly D comprises a shaft bearing housing 36 depending from the support 21. A rotatable shaft 37 is journalled in the housing 36 and is capable of limited axial movement therein. The upper portion of shaft 37 projects through the cantilever support 21. A gear reducer 38 is mounted on the upper surface of the cantilever support 21 and has a driving engagement with the shaft 37 by means not shown. Axial movement of the shaft 37 is limited by an upper limit ring 37a which abuts against the upper portion of the gear reducer 38 when shaft 37 is in its lowest position and an adjustable lower limit ring 37b which abuts against the shaft bearing housing 36 when shaft 37 is in its uppermost position, both of which limit rings are mounted on shaft 37 and coaxial therewith.

Mounted on the lower end of the shaft 37 is a tire rim hub member 39 to which an upper split rim tire receiving member 40 is removably attached, by means not shown. The member 40 has a cylindrical face 41 in which is formed a circumferential gasket seating groove 42 containing a circular elastomeric gasket 43 for sealing engagement with the inner annular surface 44 of the lower split rim member 33 as the lower member 33 is raised to engage the upper member 40. At the upper end of the tire receiving member 40 is a tire seating flange 45 with an adjacent tapered shoulder portion 46 to assist in centering and properly seating the tire 10 as it is engaged by the rim member 40.

When a tire 10 is firmly gripped between the split rim members 33 and 40 the tire may be inflated by introducing air under elevated pressure to the inside of the tire by means of an axial passageway 47 in shaft 37, which opens into radial passageways 48 in the upper split rim member 40. Air under pressure is supplied to the upper end of shaft 37 through a rotary pneumatic union 49 which connects the passageway 47 with a source of high pressure air by means of a pneumatic hose 50.

When a tire is being inflated to its predetermined pressure, the sidewalls move apart, the tire bead on the upper side of the tire forcing the tire receiving member 40 upward against the force of gravity until limit ring 37b abuts against the shaft bearing housing 36. Limit ring 37b is adjustably located on shaft 37, in accordance with the size of tire being worked upon, so that at the time it abuts against housing 36 the sidewalls of the tire are each flattened in a horizontal plane.

The tire is rotated at this time by means of a drive motor 51 which is mounted on the upper surface of cantilever support 21 and is connected to the input shaft 52 of the gear reducer 38 by means of sheaves 53 and 54 and an endless belt 55.

*Sidewall Buffing Assembly*

Suspended from the lower side of the upper cantilever support 21 are the sidewall buffing assemblies E. Each assembly E is mounted in such a manner that the position of a cloth buffing wheel 56 mounted thereon may be adjusted radially of the tire 10 mounted on the rim members 33 and 40. Provision is also made for vertical positioning of the buffing wheel 56 in accordance with the size of the tire being worked upon.

Fastened to the underside of the cantilever support 21, by means not shown, is the main sidewall abrading assembly support plate 57. Depending from the lower side of the support plate 57 and disposed at either end thereof are a pair of vertical support brackets 58 and 59. Mounted between the lower ends of the brackets 58 and 59 are a pair of horizontal parallel guide bars 60. Slidably mounted on the guide bars 60 is a slide bracket 61 having a vertical portion 62 on the upper surface thereof. The portion 62 is tapped with a female thread 63. Journalled between the upper ends of brackets 58 and 59, and parallel to guide bars 60, is a male adjusting screw 64 engaged with the female thread 63 of the slide bracket 61 and having an adjusting hand wheel 65 mounted on its outer end. The construction is such that, as the hand wheel 65 is rotated, the slide bracket 61 is moved horizontally in a direction dependent upon the direction of rotation of the hand wheel 65. Positioning may be accomplished to a predetermined point by means of setting an indicator 66 mounted on the upper surface of slide bracket portion 62 with respect to scale markings 67 formed in the side of support plate 57.

Depending from slide bracket 61 are four vertical adjusting rods 68, each having male threads 69 formed thereon. Movably mounted on each rod 68 is a thread follower 70. Each thread follower 70 is rotatably journalled in a horizontal platform 72. At the upper end of each follower 70 is a small sprocket 71. Also journalled in platform 72 is a rotatable shaft 73 having a handwheel 74 mounted at its lower end and a sprocket 75 mounted at its upper end. Trained about sprockets 71 and 75 is a chain 76. Thus, as handwheel 74 is rotated, followers 70 move along their respective threads 69 to raise or lower platform 72.

On the lower side of the platform 72 is mounted a pivot bracket 79. A second pivot bracket 81 is pivotally connected to bracket 79 by means of a pivot rod 80. A motor mount platform 82 is mounted on the underside of bracket 81. On the underside of the platform 82 is pivotally mounted by means of a pivot 78 a motor 83 having an extended drive shaft 84. At the outer end of the shaft 84 is mounted the buffing wheel 56 by means of washers 85 and a lock nut 86. The buffing wheel 56 is positioned for grinding by means of a heavy vertical spring 87 mounted on one end of the upper surface of the motor mount platform 82 with its upper end engaged with the lower side of the platform 72 and normally holding the buffing wheel 56 in the position shown in full lines in FIG. 4. Spring 87 is selected so that it just slightly more than counterbalances the weight of the motor 83 in order that the grinding wheel 56 may just "float" on the sidewall of the tire in the grinding position. On the opposite end of the motor mount platform 82 is mounted a single-acting air cylinder 88 having a piston 89 and a piston rod 90 engageable with the lower side of an adjusting screw 77 threadably engaged in one end of the platform 72. By adjusting screw 77 in platform 72 the extent of pivotal movement of platform 82 about rod 80 in response to operation of cylinder 88 may be controlled. As air is introduced through an air line 91 into the lower side of the normally lowered piston 89, the piston and its piston rod 90 are raised to engage the screw 77, thus causing the motor mount platform 82 to pivot about pivot rod 80 to compress spring 87. A stop rod 92 is adjustably mounted on platform 82 inside of the spring 87 to limit pivotal movement of the motor platform 82. Although side sway of the motor 83 from side to side is almost completely eliminated due to the mounting of platform 72 on vertical rods 68, additional stabilization is obtained through the use of vertical guide members 93 mounted on either side of the slide bracket 61 and slidably engaged with the sides of the horizontal platform 72 and the sides of platform 82.

To further provide for fine adjustment of the operative position of buffing wheels 56 a reversing adjusting screw 174 is rotatably mounted between platform 82 and a base 175 of motor 83 by means of gimbal mountings 176 and 177 respectively. As screw 174 is rotated the angle between platform 82 and motor base 175 may be varied.

The motors 94 of the sidewall grinding assemblies F are suspended from the cantilever support 21 and adjustable in a manner substantially like that for mounting and adjusting the buffing motors 83. Thus, the main assembly support plates 95 are mounted on the underside of the cantilever support 21. At the ends of the lower side of each support plate 95 are mounted support brackets 96, between which are mounted a pair of horizontal parallel guide bars 97. Slidably mounted on the bars 97 is a slide bracket 98 centrally tapped with a female thread, not shown. Also mounted between brackets 96, and journalled therein, is a male adjusting screw 99 engaged in the female thread of the slide bracket 98. On the outer end of the screw 99 is mounted a hand wheel 100. The hand wheel 100 may be rotated to horizontally position the slide bracket 98.

Depending from the corners of slide bracket 98 are four vertical adjusting rods 101, each having male threads 102 formed thereon. Movably mounted on each rod 101 and engaged with thread 102 is a screw follower 103. Each screw follower is journalled in a horizontal platform 105. Mounted on the central portion of each follower 103 is a small sprocket 104. Also journalled in platform 105 is a rotatable shaft 106 having a handwheel 107 mounted at its lower end and a sprocket 108 at its upper end. Trained about sprockets 104 and sprocket 108 is an endless chain 109. Thus, as handwheel 107 is rotated, followers 103 move along their respective threads 102 to raise or lower platform 105.

Pivotally mounted to a vertically extended pivot bracket 111 on the lower side of platform 105, by means of its pivot bracket 112, is a motor mount platform 113. Pivotally mounted to the underside of the platform 113 by means of a pivot assembly 110 is mounted the grinding motor 94 which drives a grinding wheel 115. The grinding wheel 115 is lowered and raised by means of a double-acting air cylinder 116 pivotally mounted to the side of motor platform 105 and having a piston 117 and a piston rod 118, see FIGS. 1 and 7. The outer end of the piston rod 118 is pivotally mounted to the motor mount platform 113 and the cylinder 116 is pivotally mounted on one end of the platform 105. Thus, as air is introduced to the upper side of piston 116, as viewed in FIG. 1, and exhausted from the lower side, the grinding wheel 115 is lowered to buffing contact with the sidewall of a tire 10. The motors 94 are also restrained from side sway in the manner of motors 83 by means of vertical guide members 119 mounted on the sides of slide brackets 98 and slidably engaged with the sides of horizontal platform 105, platform 113 and the base of motors 94.

*Pneumatic Circuit*

All of the pneumatically operative components of the apparatus A are operated from a single outside source of high pressure air, not shown. Air is supplied to the apparatus from this source by a feed line 120, containing a main shutoff valve 121. The stream of air is divided, as at 122, into two main lines, 123 and 124. Line 123 furnishes air to the upper split rim member 40 for inflation of the tire 10, and line 124 furnishes air for raising the lower split rim member 33, as well as air for the single-acting air cylinders 88, used to position the buffing wheels 56, and the double-acting air cylinders 116, used to position the grinding wheels 115. A pressure regulator 125 is located in line 123 to control the pressure supplied to the air reservoirs formed by the vertical side support members 20. The air is conducted from the reservoirs 20 by air line 126 to a 3-way solenoid-operated, spring return air valve 127 which, when energized, allows air to flow in line 128. Line 128 is connected to the flexible air hose 50 attached to the rotary union 49 at the upper end of the shaft 37. Thus, air may be brought to the axial passageway 47 in shaft 37 and then to the tire by means of the radial passageways 48 in the upper split rim member 40. When solenoid valve 127 is deenergized it returns to its normally closed position and line 128 is exhausted through the valve to exhaust line 129.

A pressure regulator 130 is located in main line 124 to primarily control the pressure applied to the air cylinders 26, 88 and 116. Line 124 is tapped as at 131 to provide air for the double-acting air cylinder 26. A short line 132 brings the air to a 4-way solenoid operated spring return air valve 133 which, in its normal position, directs air through line 134 to the upper side of the piston 27 of the large, double-acting air cylinder 26. Line 134 contains air speed control valve 135 which allows full flow in line portion 134a when it supplies air to cylinder 126, and provides controlled, reduced reversed flow in line 134 when piston 27 of the cylinder 26 is being raised, thus preventing the hazard of a fast closure of the split rim members 33 and 40. When the valve 133 is energized, air from line 132 is directed to line 136 and line 134 is exhausted to exhaust line 137. Line 136 also contains an air speed control valve 138 allowing full flow in the direction of the cylinder 26 and reduced, controlled flow in the opposite direction. Line 136 is branched as at 139 into two lines, 136a and 136b which join again at 140. In branch 136a is located a solenoid-operated spring return valve 141, which when energized along with energization of solenoid valve 133, allows air to pass freely into the cylinder 26 below the lower side of piston 27 to raise the lower split rim 33. In branch line 136b is located a check valve 143 allowing full flow of air to the cylinder 26 but very restricted flow in the opposite direction. Thus, in case of a power failure while the tire is inflated on the split rim, the 2-way solenoid valve 141 is closed and the cylinder 26 can be exhausted on the lower side of piston 27 only through the check valve 143 to line 136 and valve 133 to exhaust line 137. The lower split rim member 33 is then lowered slowly allowing the tire to deflate through solenoid valve 127 rather than by a dangerous explosive decompression in the close proximity of the operator if the lower rim member 33 were to drop suddenly. In normal operation when solenoid valve 133 is deenergized, air under pressure is admitted to the top side of the piston 27 of the cylinder 26 forcing it downward and exhausting the lower side through solenoid valves 141 and 133 to exhaust line 137.

A feed line 144 is connected to the main line 124 at 145 to bring air to a solenoid operated spring return valve 146. When solenoid valve 146 is energized, air is directed to line 91, forcing piston 89 and piston rod 90 of the single-acting air cylinders 88, as seen in FIGS. 4 and 7, to move upward to engage the underside of the horizontal platform 72, thus pivoting motor platforms 82 to raise the buffing wheels 56 from the side wall of the tire 10. When solenoid valve 146 is deenergized, air from the cylinders 88 is exhausted, by the action of the springs 87 of the buffing assemblies E, through exhaust line 148 of the solenoid valve 146.

Line 124 is branched at 114 to form line 142 which directs air to a three way solenoid valve 147, which, when deenergized, directs air from line 142 to the upper end of its respective cylinder 116, as viewed in FIG. 7, through line 148, forcing piston 117 to its dotted line position, air from the underside of piston 117 being exhausted through line 149 and filter 150. When valve 147 is energized, the weight of the grinder motor 94 tends to move the grinding wheel 115 downward, under the force of gravity to withdraw piston rod 118 from cylinder 116. As this is done, air is admitted to the underside of piston 117 through filter 150 and line 149 and air from above piston 117, as viewed in FIG. 7, is directed through valve 147 to line 151. Air line 124 is branched, as at 152, to line 178, which carries air through a regulating valve 179 to line 151. Valve 179 is set to slightly overcounterbalance the moment of assembly F about its pivots 111, 112. Line 151 is bled to an exhaust regulator valve 180 set to a pressure which will just counterbalance this moment. The differential between regulators 179 and 180 is necessary to insure sufficient balancing pressure in line 151. By proper setting of these regulator valves 179 and 180 the grinding wheels 115 may be brought into very light contact with the surface of the tire 10 without the danger of digging into the tire as may occur when a spring biasing system is used to counterbalance the moment of assemblies F and the spring loses its modulus. The other cylinder 116 is identically connected to line 124 and is operated by a three way solenoid valve 181.

*Electrical Control Circuit*

Figure 8:
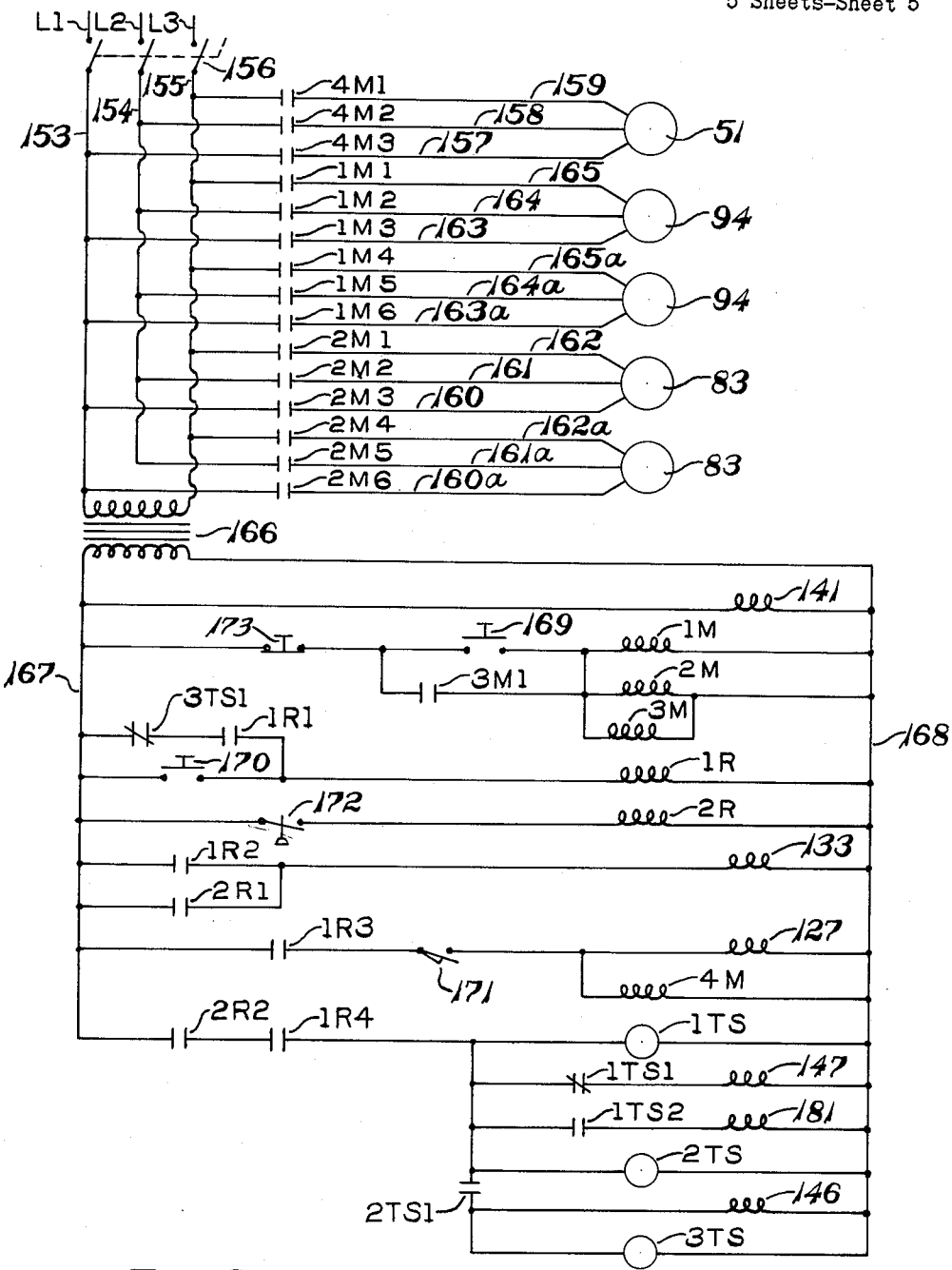
FIG. 8 is a schematic, across-the-line, wiring diagram of the electrical control circuit for the apparatus.

As seen in FIG. 8, power for the electrical control circuit is conducted from a source of alternating electrical current, not shown, of the 3-phase, high voltage type by means of electrical supply lines L1, L2, and L3. Supply lines L1, L2, and L3 are connectible with conduit lines 153, 154, and 155, respectively, by means of a triple pole, single throw type switch 156. The split rim drive motor 51 is connected to conduits 153, 154, and 155 by wires 157, 158 and 159, respectively, which wires contain switch contacts 4M3, 4M2, and 4M1, respectively. The buffing motors 83 are each connected to conduits 153, 154, and 155 by wires 160, 161, 162, and 160a, 161a, and 162a, respectively. The grinding motors 94 are connected to conduits 153, 154, and 155 by wires 163, 164, and 165, and 163a, 164a, and 165a, respectively. A stepdown transformer 166 has its primary coil connected between conduits 153 and 155 to produce lower voltage in its secondary coil, which is connected to distribution wires or bus bars 167 and 168. A more comprehensive understanding of the electrical control circuit may be obtained from the description of the machine operation which follows. For ease of understanding, such items as overload circuit breakers, and fuses have not been shown.

*Machine Operation*

To begin operation, the operator opens the air valve 121, throws switch 156 to energize the circuit and places a tire 10 on the lower split rim member which is then at its lower position separated from member 40. Solenoid valve 141 is instantly energized to open airline 136a. The operator then momentarily depresses a start button 169 which energizes relays 1M, 2M, and 3M. Energization of relay 1M closes its contacts 1M1, 1M2, 1M3, 1M4, 1M5 and 1M6 to start the grinding motors 94. Energization of relay 2M closes its contacts 2M1, 2M2, 2M3, 2M4, 2M5, and 2M6 to start the buffing motors 83. Energization of relay 3M closes its contact 3M1 to effect a holding circuit about the start switch 169.

The operator then depresses the start cycle button 170 to energize relay 1R. Energization of relay 1R closes its contact 1R1 to effect a holding circuit about the start button 170, closes its contacts 1R2 which allows energization of the solenoid valve 133. Valve 133 directs air to the underside of piston 27 of the large double-acting air cylinder 26 to raise the lower split rim member 33 with the tire 10 mounted thereon the entire length of the piston stroke. Energization of relay 1R also closes contacts 1R3 and 1R4 to set up their respective circuits. As the lower split rim member 33 telescopically engages the upper split rim member 40, the upper bead of the tire 10 rides up to tapered rim surface 46 and becomes seated against the seating flange 45. Continued raising of the tire 10 causes the upper rim member 40, shaft 37 and the rotary union 49 to rise a small distance, on the order of ¼ inch, to close a normally open limit switch 171, seen only in FIG. 8. Closure of limit switch 171 energizes solenoid valve 127 to direct air to the inside of the tire 10, expanding the sidewalls of the tire 10 outward into a relatively flat horizontal position ready for finishing, thus raising upper rim member 40 until limit ring 37b engages housing 36, and also energizing relay 4M. Energization of relay 4M causes its contacts 4M1, 4M2 and 4M3 to close to start the rim drive motor 51 which rotates the tire about its axis. When a predetermined pressure is obtained in the tire 10, a pressure switch 172, located in the air feed line, is closed to energize relay 2R. Energization of relay 2R closes its contacts 2R1 and 2R2. Closure of contact 2R1 effects a sealing circuit about contact 1R2 which will be open before it is desired to deenergize solenoid 133. Closure of contact 2R2 energizes timer switches 1TS and 2TS, and solenoid valve 147. Energization of solenoid valve 147 causes it to exhaust air from its air cylinder 116, thus allowing its grinding wheel 115 to lower to abrading contact with the sidewall of the tire 10.

At the expiration of a first predetermined time for which it was set, timer switch 1TS acts to open its normally closed contacts 1TS1, holding them open until the entire circuit is deenergized, and closes its normally open contacts 1TS2. Opening of contacts 1TS1 deenergizes solenoid valve 147, returning it to its normally open position to direct air to its cylinder 116 to raise the abrading wheel 115 from the sidewall of the tire 10. Closing of contacts 1TS2 energizes solenoid valve 181 to lower the second abrading wheel 115 into contact with the sidewall of the tire 10 in the same manner in which the first abrading wheel 115 was lowered. At the expiration of a second predetermined time for which it was set, timer switch opens contacts 1TS2 to deenergize solenoid valve 181 and raise the second grinding wheel 115 from the sidewall of the tire 10. Grinding wheels 115 are lowered to the tire 10 separately in order to make use of a coarse abrasive in the first wheel and a fine abrasive in the second. At this time timer switch 2TS times out to close its contacts 2TS1 effecting energization of solenoid valve 146 and a third timer 3TS. Contacts 2TS1 are held in closed position by the operation of the timer 2TS until the circuit in which the timer is located is deenergized. Energization of solenoid valve 146 directs air through line 91 to raise pistons 89 in air cylinders 88 and bring the buffing wheels 56 into engagement with the abraded sidewall of the tire 10 for a predetermined time. At the expiration of that time timer 3TS operates to open its normally closed contacts 3TS1, deenergizing relay 1R. Deenergization of relay 1R reopens all of its contacts 1R1, 1R2, 1R3, and 1R4 to deenergize their respective circuits with the exception of the subcircuit containing by-pass contact 2R1. Thus, solenoid valve 127 is deenergized to allow air to exhaust from the tire 10 through line 129, and relay 4M is deenergized to shut down the rim drive motor 51. Also, solenoid valve 146 is deenergized to raise the buffing wheels 56 from the sidewall of the tire 10.

When the air pressure in the tire 10 drops below a predetermined value, pressure switch 172 is opened to deenergize relay 2R. Deenergization of relay 2R causes its contacts 2R1 and 2R2 to open, deenergizing solenoid valve 133, and directing air through line 134 to the upper side of piston 27 in cylinder 26, thus lowering the tire 10 from the upper split rim member 40 and allowing the operator to remove the finished tire. Opening of the relay contact

I claim:

1. In a tire sidewall abrading and cleaning apparatus having telescoping and rotatable tire mounting members to rotatably mount and inflate a tire with its sidewalls flattened in planes perpendicular to the axis of said tire, and at least one rotatable tire sidewall abrading and cleaning member for engagement with a flattened sidewall of a tire mounted on and rotated by said mounting members; the improvement comprising, in combination:

(a) a first support means movable toward and away from the plane of a flattened sidewall of a tire mounted on said mounting members;

(b) a second support means pivotally mounted on said first support means;

(c) means to move said second support means relative to said first support means;

(d) means pivotally mounting said abrading and cleaning member on said second support means; and (e) means to move said abrading and cleaning member effecting a variation in the orientation of the axis of rotation of said abrading and cleaning member with respect to said second support means;

whereby said abrading and cleaning member may be brought accurately to and from said engagement at a preselected location on said flattened sidewall.

2. In a tire sidewall abrading and cleaning apparatus having upper and lower rotatable tire mounting members for telescoping, fluid pressure sealing engagement with one another through the central opening of a tire, means to inflate a tire mounted thereon with its sidewalls flattened in planes perpendicular to the axis of rotation of said mounting members, at least one tire sidewall abrading member and at least one tire sidewall buffing member, comprising, in combination with each abrading and buffing member:

(a) a first support means mounted on said apparatus for movement toward and away from said axis in a plane perpendicular to said axis;

(b) means to move at least a portion of said first support means toward and away from said axis while maintaining the orientation of said first support means relative to said plane;

(c) a second support means pivotally mounted on said first support means;

(d) means to pivot said second support means about an axis parallel to said plane;

(e) means pivotally mounting each abrading and buffing member on said second support means; and (f) means to pivot each abrading and buffing member about an axis parallel to said plane to thereby vary the angle included between said plane and the axis of rotation of said abrading and buffing member;

whereby said abrading and buffing members may be accurately initially positioned for movement to and from a predetermined location of engagement with a sidewall of said tire.

3. Apparatus as defined in claim 2; wherein said means to move at least a portion of said first support means further comprises:

(a) at least one support shaft mounted on said first support means;

(b) means movably mounting said portion on said shaft; and (c) means to move said portion in directions parallel to the axis of said shaft.

4. Apparatus as defined in claim 2; wherein said means to move at least a portion of said first support means further comprises:

(a) at least one support shaft mounted on said first support means;

(b) screw threads formed on each support shaft;

(c) a screw thread follower engaged with the screw threads of each support shaft and mounted on said portion; and (d) means to cause relative rotary movement between each said follower and its respective screw threads, to thereby move said portion in directions parallel to the axis of said shaft.

5. Apparatus as defined in claim 2, wherein the means to pivot said second support means further comprises:

(a) resilient means normally urging said second support means away from said first support means; and (b) fluid pressure means operable to overcome said resilient means.

6. Apparatus as defined in claim 2; wherein said means to move at least a portion of said first support means further comprises:

(a) at least one support shaft mounted on said first support means parallel to said axis;

(b) screw threads formed on each support shaft;

(c) a screw thread follower movably engaged with the screw threads of each support shaft;

(d) means rotatably mounting each said follower on said portion;

(e) and means to jointly rotate said followers, whereby said portion may be moved toward and away from said plane while maintaining the orientation of said portion with respect to said axis.

7. Apparatus as defined in claim 6, wherein said means to jointly rotate said followers further comprises:

(a) a sprocket mounted about each of said followers;

(b) a sprocket drive chain trained about each of said sprockets; and (c) means to move said chain in directions parallel to its length.

References Cited in the file of this patent

UNITED STATES PATENTS

| | | |
|---|---|---|
| 2,986,849 | Clark | June 6, 1961 |
| 3,001,334 | Giusti et al. | Sept. 26, 1961 |
| 3,077,060 | Cooper | Feb. 12, 1963 |

UNITED STATES PATENT OFFICE
CERTIFICATE OF CORRECTION

Patent No. 3,137,976

June 23, 1964

Ralph F. Cooper

It is hereby certified that error appears in the above numbered patent requiring correction and that the said Letters Patent should read as corrected below.

Column 1, line 41, for "underground" read -- unground --.

Signed and sealed this 3rd day of November 1964.

(SEAL)
Attest:

ERNEST W. SWIDER
Attesting Officer

EDWARD J. BRENNER
Commissioner of Patents